United States Patent Office 3,078,774
Patented Feb. 26, 1963

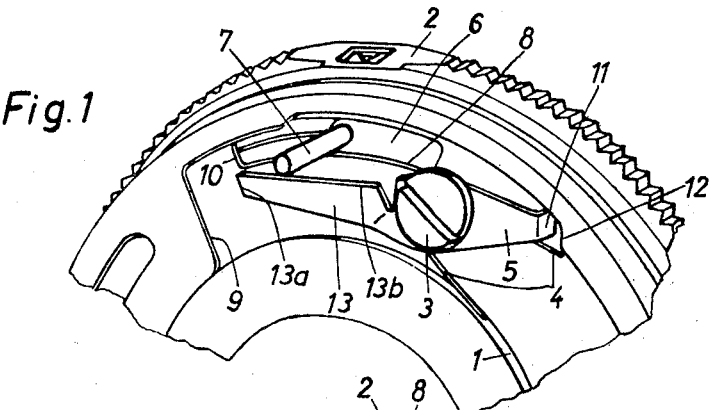

3,078,774
MANUALLY AND AUTOMATICALLY CONTROLLABLE EXPOSURE ASSEMBLY FOR CAMERAS
Gerd Kiper, Unterhaching, near Munich, Germany, assignor to Agfa Aktiengesellschaft, Leverkusen-Bayerwerk, Germany
Filed Aug. 16, 1961, Ser. No. 131,884
Claims priority, application Germany Aug. 20, 1960
8 Claims. (Cl. 95—10)

The present invention relates to cameras.

More particularly, the present invention relates to cameras which are provided with exposure controlling assemblies capable of being operated either manually or automatically.

With cameras of this type it is necessary to provide a structure which will prevent the automatic setting structure from influencing the exposure-determining members of the camera during the time when the camera is manually set so as to provide a manual determination of the exposure. Thus, it is conventional to provide for this purpose a lever or the like which locks the automatic structure against operation when at least one of the manually operable members of the camera is actuated by the operator.

Such conventional structures in addition to being relatively complex give rise to even greater drawbacks in that it is possible for the structure of the camera to become jammed and permanently injured in the event that the camera is operated manually before a complete cycle of the automatic exposure determining structure has been performed.

It is accordingly one object of the present invention to provide a structure which is incapable of jamming or injuring parts of the camera in the event that the operator improperly operates the camera, as by introducing manual controls during the time when the automatic control structure is operating.

Another object of the present invention is to provide a structure which is exceedingly simple and reliable in operation.

A further object of the present invention is to provide an exceedingly compact simple structure which can without difficulty be incorporated into existing cameras for providing a reliable lock against operation of the automatic structure during the time when the camera is operated manually.

With these objects in view the invention includes, in a camera which has an exposure controlling assembly which is capable of being operated either manually or automatically a support means and an exposure controlling member movably carried by the support means. A connecting means is carried by the exposure controlling member for connecting it to a structure which is capable of automatically determining the position of the exposure controlling member, and this connecting means as well as the exposure controlling member have a predetermined rest position which they take when the camera is to be operated manually. A manually operable means is also movably carried by the support means, and a cam means is connected to the manually operable means for movement therewith. A lock lever means is turnably carried by the support means and has its position controlled by the cam means which is engaged by a portion of the lock lever means. When the connecting means and exposure controlling member are in their rest position and the manually operable means is moved to a position other than that which it takes when the camera is set for automatic operation, the cam means cooperates with the lock lever means to place it in a position where it engages the connecting means to prevent movement of the connecting means and exposure controlling member by the structure which automatically determines the position of the exposure controlling member. This lock lever means of the invention has a yieldable portion which engages the connecting means so that if the operator should move the manually operable means away from the position it has when the camera is set for automatic operation before the connecting means and exposure controlling member reach their rest position, then this yieldable portion of the lock lever means is capable of yielding during return of the connecting means and exposure controlling member to their rest position so as to prevent jamming and injury of the camera components.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary perspective illustration of one possible structure according to the present invention, this structure being shown during automatic operation of the camera;

FIG. 2 shows the structure of FIG. 1 in a different position of the parts;

FIG. 3 shows the structure of FIG. 1 where the parts are set for manual operation.

Figure 4:
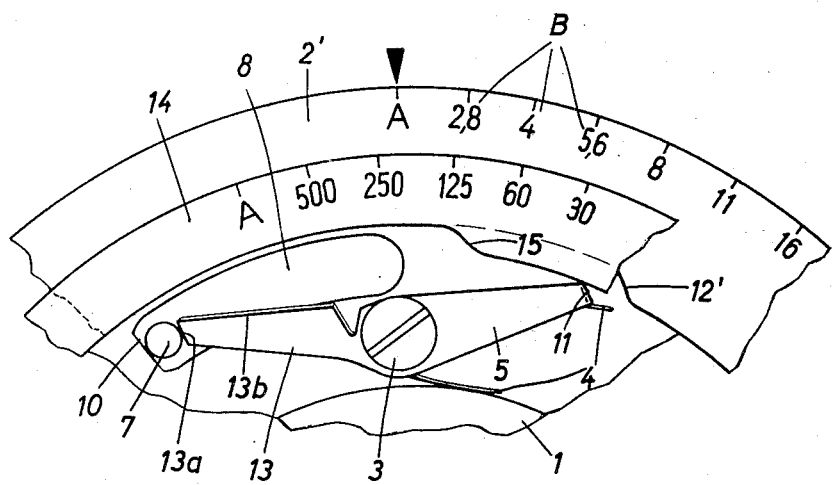
FIG. 4 shows in a partly diagrammatic manner another embodiment of the invention.

Referring to FIG. 1 there is fragmentarily illustrated therein a shutter housing 1 which forms a support means for the movable parts. A manually operable means 2 takes the form of a manually turnable ring supported for rotary movement by the support means or shutter housing 1, and the manual turning of the ring 2 will result in adjusting the diaphragm so as to set the exposure aperture of the camera in a well-known manner. The manually operable means 2 is shown in FIG. 1 in the predetermined angular position it takes when the camera is set for automatic operation, and it will be noted that in this position there is visible through a window at the upper part of the ring 2, as viewed in FIG. 1, a letter A which indicates to the operator the angular setting of the ring 2 for automatic camera operation.

A screw member 3 is fixed to the housing 1 and forms part of the support means, and this screw member 3 serves to pivotally support a lock lever means in the form of a one-piece lever 5 which is urged by a spring 4 to turn in a counterclockwise direction around the shank of the screw member 3, as viewed in FIG. 1. The spring 4 is in the form of a wire spring coiled around the screw member 3, engaging with its lower end, as viewed in FIG. 1, against a shoulder of the housing 1 and with its upper end against a lug 11 formed at the right end of the lever 5, as viewed in FIG. 1.

Within the shutter housing 1 is located an exposure controlling member 6 which in the illustrated example is a turnable ring member which upon turning will in a well known manner adjust the diaphragm, and a connecting means is carried by the exposure controlling member 6 and is adapted to be connected with a structure capable of automatically turning the control member 6, this connecting means being in the form of a pin 7 which extends from the control member 6 through an opening 8 formed in the housing 1 as well as through a cutout 9 formed in the manually turnable ring 2. The structure which is connected to the pin 7 for automatically determining the angular position of the ring 6 in accordance with the lighting conditions is well-known in the art and forms no part of the present invention, so that it is not illustrated in the drawings. In the rest position of the structure for automatically setting the exposure controlling member 6, the pin 7 and the member 6 are turned to the left from the position shown in FIG. 1 with the pin 7 engaging the end 10 of the opening 8 through which the pin 7 extends. This is the rest position of the pin 7 before the automatic structure is released by the operator for automatically determining the setting of the camera. The pin 7 is shown in FIG. 1 in an intermediate position which it takes under the influence of the unillustrated automatic light-sensing structure which moves moves the pin 7 and the ring 6 in accordance with the lighting conditions.

In accordance with the present invention the lever 5 cooperates with a cam means which is connected to the manually operable means 2 to move therewith, and this cam means is shown in the form of an edge 12 which forms part of the ring 2 and which engages the lug 11 at the end of the lock lever 5. The spring 4 of course maintains the lug 11 in engagement with the cam 12.

In addition, the lever means 5 includes an elongated springy arm 13 which forms a yieldable portion of the lever 5 adapted to yield under conditions referred to below. The arm 13 forms the locking portion of the lever 5, this locking portion 13 engaging the connecting means or pin 7 to prevent movement thereof in a manner described below, in the case where the camera is set for an operation other than automatic operation, such as for operation with flash or for manual operation. In the position of the parts shown in FIG. 1 where the manually turnable means 2 has been placed in the predetermnied position required for automatic operation, the cam means 12 cooperates with the lock lever means 5 to locate the later in the illustrated angular position where the arm 13 of the lever is out of the path of movement of the connecting means or pin 7 so that the element 7 is free to move and therefore the structure for automatically determining the setting of the camera can operate freely to turn the exposure controlling member 6.

It will be noted that in FIG. 3 the manually operable means 2 has been placed in a different position where the letter B appears in the window of the ring 2, and this is the position in which the operator sets the ring 2 preparatory to making a flash exposure. Of course, the structure for automatically determining the exposure is rendered inoperative at this time, and it will be noted that in this position of the parts the cam 12 engages the lug 11 of the lever 5 to place the lever 5 in an angular position where the end 13a of the arm 13 engages the pin 7 to prevent the movement of the pin 7 and the control member 6 so that the automatic structure cannot set the camera in this position of the parts. The manually operable means 2 actuates a second diaphragm controlling member for providing a predetermined exposure aperture when the ring 2 is placed by the operator in the position shown in FIG. 3, and it will be noted that in this position the pin 7 engages the edge 10 of the opening 8 and is maintained in this rest position by the arm 13 of the lock lever means 5. In FIG. 2, a pair of diaphragm operating rings 50 and 51 are fragmentarily and diagrammatically shown, these rings cooperating with the diaphragm blades, one of which is shown at 53, for controlling the size of the aperture. The ring 51 is the second diaphragm controlling member referred to above, while the ring 6 is fixed with the diaphragm controlling ring 50 to turn the later for setting the exposure aperture.

The structure for automatically setting the camera places the pin 7 and the ring 6 in a predetermined rest position before the automatic structure is released for operation, and it may happen that while the automatic structure is operating the operator will, contrary to the instructions for operation which are provided with the camera, turn the ring 2 away from the position indicated in FIG. 1 where it should be located for automatic operation. In other words, the operator may erroneously introduce manual operations while the automatic structure is operating, and these conditions are illustrated in FIG. 2 which shows the ring 2 in the position of FIG. 3 before the pin 7 has returned to the position indicated in FIG. 3. Under these conditions the automatic structure will still be able to return the pin 7 to its rest position since the springy arm 13 will simply yield while the pin 7 moves along the edge 13b of the arm 13, and when the pin 7 reaches its rest position engaging the edge 10 of the opening 8 the springy arm 13 will simply snap to the position indicated in FIG. 3 to lock the pin 7 in its rest position. Thus, with the structure of the invention it is impossible to provide any jamming or injury of the parts due to improper operations by the operator.

The structure which is illustrated in FIG. 4 is substantially identical with that of FIGS. 1–3, the principal difference being that the structure of FIG. 4 includes a manually turnable ring 14 capable of being turned by the operator for setting the exposure time. The ring 2' of FIG. 4 corresponds to the ring 2 and is used for setting the exposure aperture, and the lock lever means 5 as well as the pin 7, the opening 8, the ring 6, and the support means 1, 3 as well as the spring 4 are identical with the above-described elements which are indicated by the same reference characters. The ring 2' has a portion which is formed with the camming edge 12' corresponding to the cam means 12 described above. The exposure time setting ring 14 includes a camming edge 15 which is identical with the camming edge 12' and which forms a second cam means, and when both of the graduations A of the rings 2' and 14 are aligned with the index shown at the top of FIG. 4 the rings 2' and 14 are set for automatic operation, and in this position the lock lever means is in the position indicated in FIG. 1 where the arm 13 is out of the path of movement of the connecting means 7 as described above. The lug 11 of the lever 5 cooperates with both of the cam means 12' and 15 to be moved to the position shown in FIG. 4 when either one of the rings 2' or 14 is moved by the operator from the angular position where it is located for automatic operation to its rest position. The diaphragm setting ring 2' is still in the position it takes for automatic operation while the exposure time setting ring 14 has been turned by the operator away from the position required for automatic operation, and thus the cam means 15 cooperates with the lever 5 to place it in its locking position shown in FIG. 4. The same result would be produced by turning of the ring 2' in a counterclockwise direction, as viewed in FIG. 4, and of course the same result would be produced by turning of both of the rings away from the positions required for automatic operation. Of course, if the operator should improperly turn either one of the rings 2' and 14' from the automatic operation position while the automatic structure is acting on the pin 7 so that this pin is not located in its rest position engaging the edge 10 of the opening 8, the conditions described above in connection with FIG. 2 will obtain, and the automatic structure will nevertheless move the pin 7 along the edge 13b, the springy portion 13 yielding to permit the pin 7 to return to its rest position shown in FIG. 4, and of course in this case also the arm 13 will snap up to the position indicated in FIG. 4 as soon as the pin 7 reaches its rest position so that the end 13a of the arm 13 will engage the pin 7 to lock it in its rest position providing operation other than automatic operation.

While the invention has been illustrated and described as embodied in automatic or manually operable cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera having an exposure assembly capable of being manually or automatically controlled, in combination, support means; an exposure controlling member movably carried by said support means; connecting means carried by said exposure controlling member for connecting the same to a structure which will automatically set said exposure controlling member; manually operable means movably carried by said support means for manually setting at least part of the exposure controlling assembly of the camera; cam means connected to said manually operable means for movement therewith; and lock lever means turnably carried by said support means and engaged by said cam means to be positioned thereby, said cam means positioning said lock lever means in a position engaging said connecting means to prevent movement thereof by the structure which automatically determines the position of said exposure controlling member when said manually operable means is placed by the operator in a position other than that required for automatic operation of the camera.

2. In a camera having an exposure controlling assembly which is capable of being operated either manually or automatically, in combination, support means; an exposure controlling member movably carried by said support means and having a predetermined rest position when the camera is set for automatic operation; connecting means carried by said exposure controlling member for connecting the same to a structure which will automatically determine the position of said exposure controlling member, said connecting means also having a predetermined rest position when said exposure controlling member is in said rest position thereof; manually operable means movably carried by said support means for manually setting at least part of the exposure controlling assembly of the camera, said manually operable means also having a predetermined position in which it is placed when the camera is to be operated automatically; cam means connected to said manually operable means for movement therewith; and lock lever means turnably carried by said support means and engaged by said cam means to be placed by said cam means in a position locking said connecting means against movement from its rest position when said manually operable means is in said predetermined position, said lock lever means having a yieldable portion engaging said connecting means to yield in the event that said manually operable means is moved away from said predetermined position thereof before said connecting means is in said rest position thereof.

3. In a camera having an exposure controlling assembly which is capable of being operated either manually or automatically, in combination, support means; an exposure controlling member movably carried by said support means and having a predetermined rest position when the camera is set for automatic operation; connecting means carried by said exposure controlling member for connecting the same to a structure which will automatically determine the position of said exposure controlling member, said connecting means also having a predetermined rest position when said exposure controlling member is in said rest position thereof; manually operable means movably carried by said support means for manually setting at least part of the exposure controlling assembly of the camera, said manually operable means also having a predetermined position in which it is placed when the camera is to be operated automatically; cam means connected to said manually operable means for movement therewith; and lock lever means turnably carried by said support means and engaged by said cam means to be placed by said cam means in a position locking said connecting means against movement from its rest position when said manually operable means is not in said predetermined position, said lock lever means having a yieldable portion engaging said connecting means to yield in the event that said manually operable means is moved away from said predetermined position thereof before said connecting means is in said rest position thereof, said yieldable portion of said lever means being in the form of a springy arm one end of which engages said connecting means when the latter is in said rest position thereof to lock said connecting means against movement by the structure which automatically sets the camera and one edge of which engages said connecting means when the latter is displaced from its rest position so that upon return of said connecting means to said rest position thereof said springy arm will yield.

4. In a camera having an exposure controlling assembly which is capable of being operated either manually or automatically, in combination, support means; an exposure controlling member movably carried by said support means and having a predetermined rest position when the camera is set for automatic operation; connecting means carried by said exposure controlling member for connecting the same to a structure which will automatically determine the position of said exposure controlling member, said connecting means also having a predetermined rest position when said exposure controlling member is in said rest position thereof; manually operable means movably carried by said support means for manually setting at least part of the exposure controlling assembly of the camera, said manually operable means also having a predetermined position in which it is placed when the camera is to be operated automatically; cam means connected to said manually operable means for movement therewith; and lock lever means turnably carried by said support means and engaged by said cam means to be placed by said cam means in a position locking said connecting means against movement from its rest position when said manually operable means is not in said predetermined position, said lock lever means having a yieldable portion engaging said connecting means to yield in the event that said manually operable means is moved away from said predetermined position thereof before said connecting means is in said rest position thereof, said lever being made of a one-piece element.

5. In a camera having an exposure controlling assembly which is capable of being operated either manually or automatically, in combination, support means; an exposure controlling member movably carried by said support means and having a predetermined rest position when the camera is set for automatic operation; connecting means carried by said exposure controlling member for connecting the same to a structure which will automatically determine the position of said exposure controlling member, said connecting means also having a predetermined rest position when siad exposure controlling member is in said rest position thereof; manually operable means movably carried by said support means for manually setting at least part of the exposure controlling assembly of the camera, said manually operable means also having a predetermined position in which it is placed when the camera is to be operated automatically; cam means connected to said manually operable means for movement therewith; and lock lever means turnably carried by said support means and engaged by said cam means to be placed by said cam means in a position locking said connecting means against movement from its rest position when said manually operable means is not in said predetermined position, said lock lever means having a yieldable portion engaging said connecting means to yield in the event that said manually operable means is moved away from said predetermined position thereof before said connecting means is in said rest position thereof, said yieldable portion of said lever means being in the form of a springy arm one end of which engages said connecting means when the latter is in said rest position thereof to lock said connecting means against movement by the structure which automatically sets the camera and one edge of which engages said connecting means when the latter is displaced from its rest position so that upon return of said connecting means to said rest position thereof said springy arm will yield, said lever means being made of a one-piece element.

6. In a camera having an exposure controlling assembly which is capable of being operated either manually or automatically, in combination, support means; a rotary exposure controlling member turnably carried by said support means; a pin fixed to and extending from said exposure controlling member and adapted to be connected with a structure capable of automatically setting said exposure controlling member; a manually turnable member carried by said support means for rotary movement and being movable by the operator for manually setting at least part of the exposure controlling assembly of the camera; cam means connected to said manually turnable member for turning movement therewith; and a lock lever turnably carried by said support means, having a cam-follower portion engaging said cam means so that said cam means determines the position of said lever, said lever having a locking portion engaging said pin when said pin is in a predetermined rest position to prevent movement of said pin by the structure for automatically setting the camera, said manually turnable member having a predetermined position when the camera is set for manual or flash operation and said cam means cooperating with said lever for placing it in a position locking said pin against movement when said manually turnable member is in a position other than that required for automatic operation of the camera.

7. In a camera having an exposure controlling assembly capable of being manually or automatically operated, in combination, support means; a pair of manually turnable members supported for rotary movement by said support means and being turnable by the operator for setting the exposure time and exposure aperture, respectively, of the exposure controlling assembly of the camera; a pair of identical cams connected to said manually turnable members, respectively, for turning movement therewith, said cams being aligned with each other when said manually turnable members are both placed in a predetermined angular position where the camera is set for automatic operation; a rotary exposure controlling member supported for rotary movement by said support means; a pin fixed to and extending from said rotary exposure controlling member; and a lock lever turnably carried by said support means and having a cam-follower portion engaging said cams so that the position of said lever is controlled by said cams, said cams positioning said lever in a position out of the path of movement of said pin when said manually turnable members are set in a position for automatic operation of the camera, and said cams in any other position of either of said manually turnable members placing said lever in a position where a locking portion thereof engages said pin, when the latter is in a predetermined rest position, to prevent movement of said pin and thus prevent automatic operation of said exposure controlling member.

8. In a camera having an exposure controlling assembly capable of being manually or automatically operated, in combination, support means; a pair of manually turnable members supported for rotary movement by said support means and being turnable by the operator for setting the exposure time and exposure aperture, respectively, of the exposure controlling assembly of the camera; a pair of identical cams connected to said manually turnable members, respectively, for turning movement therewith, said cams being aligned with each other when said manually turnable members are both placed in a predetermined angular position where the camera is set for automatic operation; a rotary exposure controlling member supported for rotary movement by said support means; a pin fixed to and extending from said rotary exposure controlling member; and a lock lever turnably carried by said support means and having a cam-follower portion engaging said cams so that the position of said lever is controlled by said cams, said cams positioning said lever in a position out of the path of movement of said pin when said manually turnable members are set in a position for automatic operation of the camera, and said cams in any other position of either of said manually turnable members placing said lever in a position where a locking portion thereof engages said pin, when the latter is in a predetermined rest position, to prevent movement of said pin and thus prevent automatic operation of said exposure controlling member, said lever having a springy portion engaging said pin to yield in the event that either one of said manually turnable members are placed in a position other than that required for automatic operation before said pin is in its rest position.

References Cited in the file of this patent

UNITED STATES PATENTS

| | | |
|---|---|---|
| 2,913,969 | Faulhaber | Nov. 24, 1959 |
| 2,969,004 | Gebele | Jan. 24, 1961 |
| 2,988,977 | Rentschler | June 20, 1961 |